Jan. 8, 1929.
L. DAY
1,698,360
SOLDER TAPE
Original Filed Feb. 11, 1925
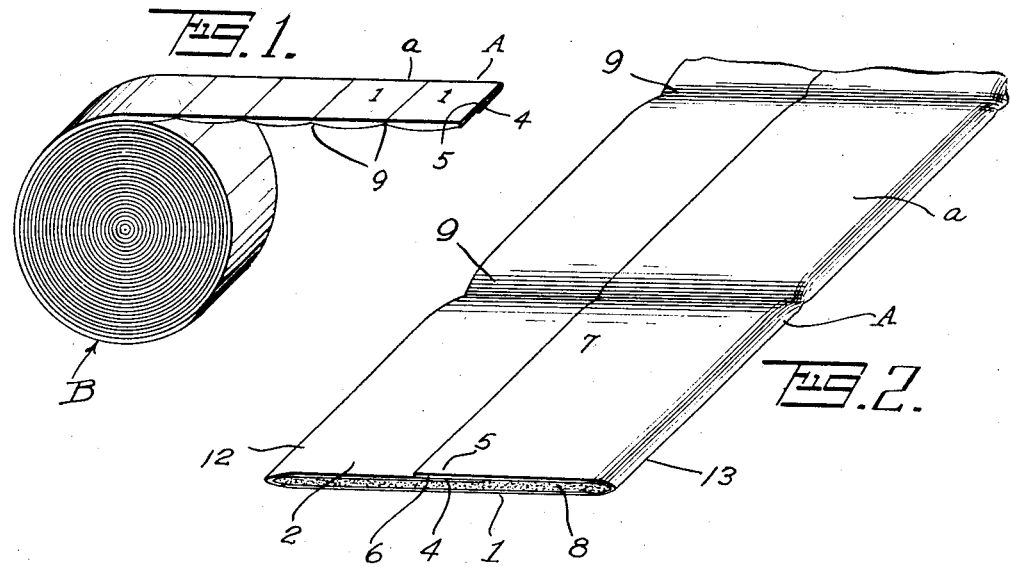
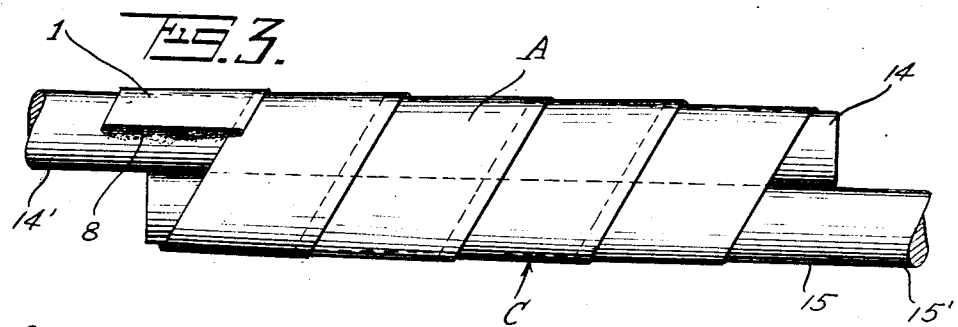
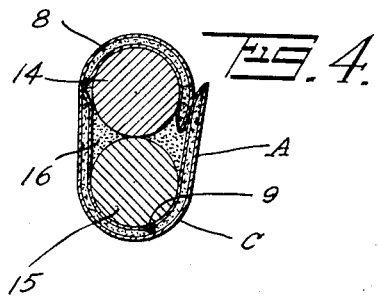
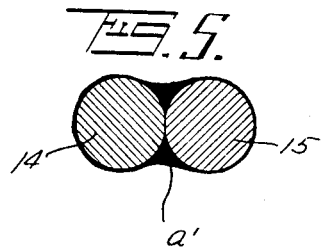
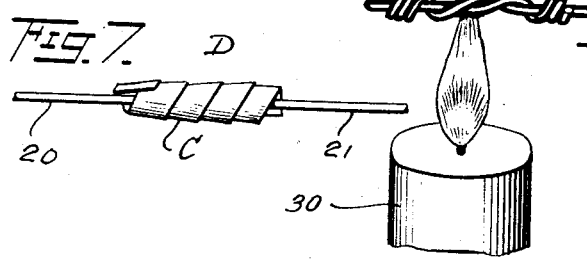
INVENTOR
LEONARD DAY.
BY
ATTORNEY Patented Jan. 8, 1929.

1,698,360

UNITED STATES PATENT OFFICE.

LEONARD DAY, OF NEW YORK, N. Y., ASSIGNOR TO CHEM-ELECTRIC ENGINEERING CORPORATION, A CORPORATION OF NEW YORK.

SOLDER TAPE.

Application filed February 11, 1925, Serial No. 8,596. Renewed June 2, 1928.

This invention relates to the art of soldering and more particularly to the art of soldering wire joints in house wiring and the like. An electric joint between two wires to be electrically perfect must be soldered and unfortunately the joints in many instances must be formed in overhead positions difficultly accessible, and it is particularly for this type of work that this invention is considered indispensable when convenience and dispatch in completing the work are concerned.

Nevertheless, it is believed that the invention is applicable to all wire splicing and in some measure to all soldering operations. More particularly, however, the invention is directed to that type of soldering in which the usual soldering iron is inappropriate.

The fundamental purpose of the invention is to do away with the difficulties usually attendant upon the use of a combined solder and flux. For example, when a combination of ground solder and flux is employed to solder a wire joint the first application of heat as a rule causes nearly all of the applied mixture to fall off from the joint as soon as the flux melts, and before the solder can be melted into intimate relation with the joint.

It is to overcome this defect, that is one of the proposed objects of this invention. In cases where a tube of solder provided with a core of flux is employed, the procedure is to use a soldering iron and one object of the invention is to do away with this necessity.

In other words, in its functioning, an object of this invention is so to fashion a joint to be soldered that heat may be applied to it through the medium of a flame from underneath, and the result will be the certain bathing of the entire joint in melted flux as a first step, and then as a second step the melting of on outer envelope of soldered foil which is pulled by the capillary attraction of the flux coated joint into intimate coating relation to the entire joint, and while the joint is protected against oxidation during the heating by the enveloping envelope or matrix of overlapping convolutions of the solder tape. The heating is best accomplished by directing a blow-pipe flame directly upon the exposed wires as they project from the envelope of solder tape to avoid a premature melting of the enveloping matrix and so that any volatilized flux must force its way out from the cracks in the matrix and aid in maintaining an absence of air against the wire surfaces to be soldered. Another objective is the distribution of the solder over the joint in the cold state in amount and position corresponding substantially to the solder of the finished soldered joint.

The above and further objects of the invention will better be understood by reference to the following specification, which should be read in connection with the accompanying drawings forming a part thereof.

It is to the embodiment illustrated and described herewith that the claims are directed but merely for purposes of illustration and not limitation.

In the drawings, Fig. 1 is a perspective view of a roll of the finished solder tape; Fig. 2 is an enlarged perspective view of a short length of the finished tape showing its inner side; Fig. 3 is a simple joint wrapped for soldering; Fig. 4 is a cross-section through the joint of Fig. 3; Fig. 5 shows the finished soldered joint of Fig. 3; Fig. 6 shows one type of ordinary wire splice to which the invention is adaptable; and Fig. 7 shows the type of wire splice shown in Fig. 6 wrapped with the solder tape.

In its manufacture this article comes out of the machine as a long ribbon like strip A which may be reeled into rolls B of a length or weight for individual packaging or sale. The structure A comprises preferably a long integral ribbon of solder foil preferably in the neighborhood of a few thousandths of an inch in thickness, so that the finished structure is easily bendable by the fingers, as is what is usually known as tinfoil used in covering candy and the like. Structurally an outer wall 1 is provided. One edge of the ribbon is folded over to form a flap 2, and the other edge is folded over to form a second flap 3. It is preferred that these flaps have overlapping portions 4 and 5 which form a simple tight joint for purposes later to be described, but which joint at the same time is also openable for purposes later to be described. The functions of the two flaps, 2 and 3 are to form an inner wall 7 slightly spaced from the outer wall 1. The space between these two walls is filled with a layer or coating 8 of any desired flux for employment with solder, such as 50-50 tin and lead. A satisfactory flux for the purpose is formed from a mixture of resin, vaseline and zinc chloride, although in fact any of the acid filled solder pastes of commercial use are contemplated. It has been found in practise that the layer 8 of flux is better held in place particularly when the finished product may be subjected to heat in storage by forming as it were individual respectacles through the lengths of the ribbon like structure. This is best accomplished by pressing down a cross line 9 of the inner wall 7 firmly against the outer wall 1 and repeating this at intervals as indicated in the drawings. These pressed down lines or scorings 9 between the two walls may readily be positioned so as to define square shaped containers $a$.

Although the drawings show flaps 2 and 3 substantially of uniform size, so that the parting 6 therebetween is midpositioned along the inner wall 7, it is to be understood that the invention is not so limited. This parting may be located anywhere across the inner wall. In fact it may be at one or the other edges 12 or 13 of the structure, although such positioning is not preferred. Furthermore, although it is preferred that the inner wall 7 be normally closed, but openable, it is within the scope of the invention that permanent openings, such as perforations be formed in this inner wall.

In the use of this article, even on otherwise disconnected wire ends, such as wire ends 14 and 15 of Fig. 3 brought alongside of each other may be wrapped with a length $A^1$ of this solder tape. The flexible, easily, bendable character of the tape adapts itself to the application as a wrapping about the wire ends and the desired length may easily be torn off with a finger-nail at one of the scorings 9. The non-resilient character of the solder foil causes the tape to hold its wrapped position without any other securing means, forming as it were a matrix or a temporary jig holding the joint together for later manipulation and later itself disappearing when it itself melts to form the finished joint. The very act of wrapping this tape about the joint presses open the parting 6 and the pressure of the fingers in applying the tape causes the discharge of flux directly upon the joint to be soldered while the imperforate outer wall 1 of the tape, forms substantially a closed outer envelope or matrix. Thus usually in the process of forming a soldered joint as contemplated herein substantially all air is removed from about the joint to be soldered by the flux, which is forced by the pressure of the outer envelope into the interstices of the joint. Note particularly the discharged flux 16 in Fig. 4. After the joint is wrapped as described all that is necessary is to apply heat in any convenient form.

If the wires are small only the heat of a match is necessary. If they are larger the naked flame of an alcohol blow lamp is very suitable. By first applying the heat to the projecting wire ends $14^1$ and $15^1$, the heat conducted into the splice proper effectively melts the flux having it bathe the parts to be soldered thoroughly, and the same to be distributed more completely by capillary action. It has been found in practise however, that it is well to heat up the entire splice by keeping the heating flame at a distance from the solder matrix covered splice, and then after the excessive flux commences to drip out of the ends of the matrix to bring the flame into closer contact with the joint, whereupon the foil body of the tape melts rapidly and flows about and into the parts to be soldered.

Although this description of the functioning of the invention has been directed more particularly to the unconnected wire ends 14 and 15, it is, of course, to be understood that its functions apply with an even greater degree of facility in connection with the fixed wire splice D shown for the wire ends 20 and 21 of Fig. 6.

The inventive thought may have a variety of expressions as is contemplated by what I claim and desire to secured by United States Letters Patent as follows:

I claim:

1. The process of soldering wire splices comprising applying a low melting point flux to the splice; inclosing a substantial portion of said flux-covered splice with a substantially air-tight envelope of overlapping convolutions of a flat strip of solder foil having a higher melting point than said flux and being distributed over said splice in the cold state in self-matrix forming and sustaining condition but leaving a portion of the wire forming said splice projecting out from said matrix; applying a heated gaseous medium to said part projecting from said matrix and effecting first a melting of said flux, then a volatilization of a part of said flux, all within said air impervious matrix; and continuing the heating until said matrix melts, causing said matrix when melted to amalgamate with the wires of said splice, whereby oxidizing of the parts to be soldered is prevented during the heating of the parts in air.

2. As an article of manufacture, a readily solderable wire splice comprising a plurality of bare portions of wire associated one with another to form a splice; a covering of low melting point flux on the surface of said portions of bare wire; an unmelted cold envelope of solder foil in the form of a strip a few thousandths of an inch in thickness wrapped in overlapping convolutions about said wires and said flux and forming a substantially air-tight envelope about said wires and flux, but leaving a portion of said wire projecting out of said envelope.

3. An article of manufacture comprising a matrix forming finger bendable non-resilient tape of a width many times its thickness and comprising two walls of foil of an alloy of lead and tin a few thousandths of an inch in thickness, a coating of a flux meltable at a lower temperature than said foil protected by said walls and located therebetween, said outer wall being imperforate and integral and said inner wall being openable by the act of bending said tape about an object to permit the escape of said flux upon said object within the confines of said outer wall.

4. The article as described in claim 3 and further characterized by the fact that said inner wall is openable for the escape of flux by reason of overlapping flaps of solder foil.

5. The article as described in claim 3 and further characterized by the fact that said tape is demarked into local substantially closed containers for said flux by cross closures formed by cross lines of close contact between said outer and inner wall.

LEONARD DAY.